United States Patent
Deplante

[15] 3,680,815
[45] Aug. 1, 1972

[54] OBTURATOR FOR OPENINGS FORMED IN AIRCRAFT FAIRINGS

[72] Inventor: Henri Deplante, Paris, France

[73] Assignee: Avions Marcel Dassult, Saint-Cloud, France

[22] Filed: June 14, 1967

[21] Appl. No.: 647,293

[30] Foreign Application Priority Data

June 29, 1966 France.........................6667491

[52] U.S. Cl. ................................................244/46
[51] Int. Cl. ..............................................B64c 3/40
[58] Field of Search.........244/18, 43, 46, 129 D, 137

[56] References Cited

UNITED STATES PATENTS

2,457,625  12/1948  Amiot.......................244/129 D
2,752,114  6/1956   Calvy........................244/129 D
3,356,317  12/1967  Bird..............................244/46

Primary Examiner—Robert F. Stahl
Attorney—Fleit, Gipple & Jacobson

[57] ABSTRACT

An obturator device of openings formed in aircraft surfaces, usable in particular for closing openings made in the sides of variable-geometry aircraft fuselages for accommodating the movable wings therein, characterized in that it comprises at least one curtain formed of parallel blades arranged in closely spaced juxtaposed relationship and mounted on ribs or crosspieces which interconnect said blades and are movable on guides independently of one another.

10 Claims, 10 Drawing Figures

OBTURATOR FOR OPENINGS FORMED IN AIRCRAFT FAIRINGS

This invention relates to an obturator for openings formed in airframes and more particularly in aircraft fairings or fuselages, which is devised so as to restore the unbroken surface of the skin as faithfully as possible and so as to permit movement and deformation of an aircraft member engageable into such an opening and projecting externally thereof.

Such an obturator is particularly suitable for socalled variable-geometry aircraft, the wings of which are required to penetrate to a variable extent into the fuselage, through openings provided for the purpose on each side thereof.

The obturator further makes it possible to cover a hole that would otherwise gape open when the wings are fully extended, and at the same time to continue to cover any remaining portions of the opening above and beneath the wings when the latter are partly retracted into the fuselage.

The subject obturator of this invention consists of a curtain formed of parallel blades, mutually juxtaposed with a small clearance therebetween and pivotally mounted on ribs or crosspieces which join the blades together to form a surface whose profile is determined by the shape of the crosspieces. The latter are movable on guides independently of one another and are subjected to a restoring force tending to shift them in the direction of extension of the curtain over the opening to be covered. Thus, unequal movements of the crosspieces produced by the surface of a wing bearing against the edge of the curtain result in a torsional distortion of the blades authorized by the pivotal mounting thereof on the crosspieces, whereby the curtain continues to cover the opening at the same time as it bears resiliently on the wing.

The edge of the curtain in contact with the wing preferably consists of a lip made of a flexible material such as rubber associated with a bead having a low coefficient of friction, made for example of Teflon.

Two similar, oppositely acting curtains can be provided for complete closure of the opening, such curtains bearing respectively against the upper and lower surfaces of the wing when the latter penetrates into the opening.

It will be of advantage also to provide positive control means for separating the curtains as wing retraction is initiated, so as to form between the curtains an opening enabling the wing profile to engage thereinto. The present invention accordingly provides for one or more remotely operable actuators associated to the curtain crosspieces located in the zone of maximum wing thickness. There is thereby formed between the curtains a wedge-shaped opening through which retraction of the wing can be initiated without danger of damaging shock loadings on the curtains.

The description which follows with reference to the accompanying non-limitative exemplary drawings will give a clear understanding of how the invention can be carried into practice.

In the drawing:

FIG. 4 is a detail view of the pivots interconnecting the blades of a curtain to the several crosspieces used to assemble said blades.

FIG. 5 is the projection of a crosspiece on to a plane tangential to the curtain.

FIG. 6 is a sectional view of the crosspiece taken through the line VI—VI of FIG. 4.

Figure 1:
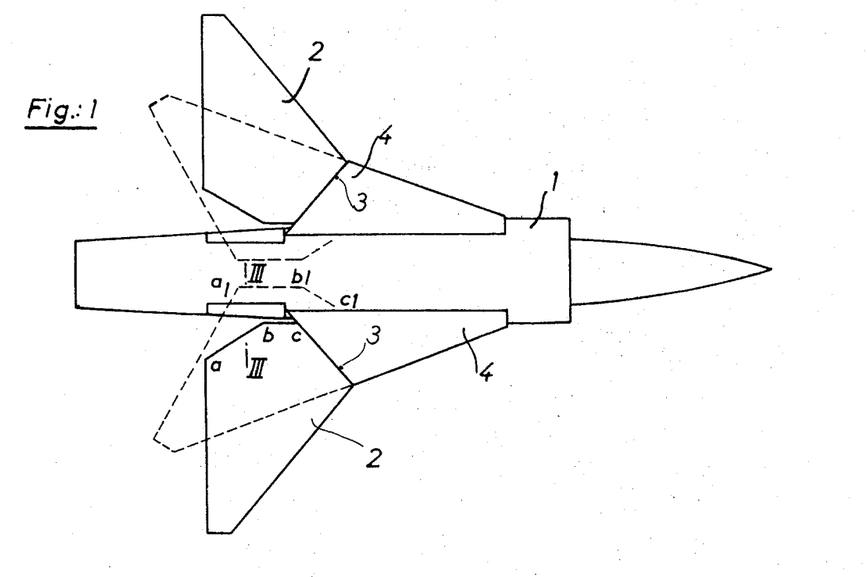
FIG. 1 is a plan view of a variable-geometry aircraft equipped with the subject device of the invention.

Reference is first had to FIG. 1 for a highly diagrammatic plan view of a variable-geometry aircraft comprising a fuselage 1 and two wings 2 capable of swinging about vertical axes 3 in order to adopt either the extended position shown in solid lines or the sharply swept back position shown in dash lines.

A sheath 4 fixed to the fuselage on either side thereof surrounds that portion of the leading edge of the associated half-wing which is adjacent the fuselage. In the configuration in which the wings are sharply swept back, the rear portion thereof must penetrate into the fuselage, so that an opening must be provided on each side of the fuselage, aft of the sheaths 4. Each such opening must be of sufficient depth to permit penetration of the wing portion $a$, $b$, $c$ which moves into the position $a_1$, $b_1$, $c_1$ when the wing is retracted for maximum sweepback. This depth must be generously computed to allow for possible wing distortions in flight due to positive or negative loads exerted thereon. The opening is closed when the wings are extended and is covered likewise above and beneath each wing when the latter are in their retracted positions shown in dash lines, while at the same time permitting wing deformations.

The obturating curtains, of which a possible constructional form will be described hereinafter, meet these different requirements.

To each of the two openings are associated two curtains, to wit an upper curtain designed to cooperate with the upper wing surface and a lower curtain cooperating with the lower wing surface. These two curtains are clearly shown in the vertical sectional illustration in FIG. 3, in which reference numeral 2 designates the wing portion retracted into the fuselage 1.

Figure 3:
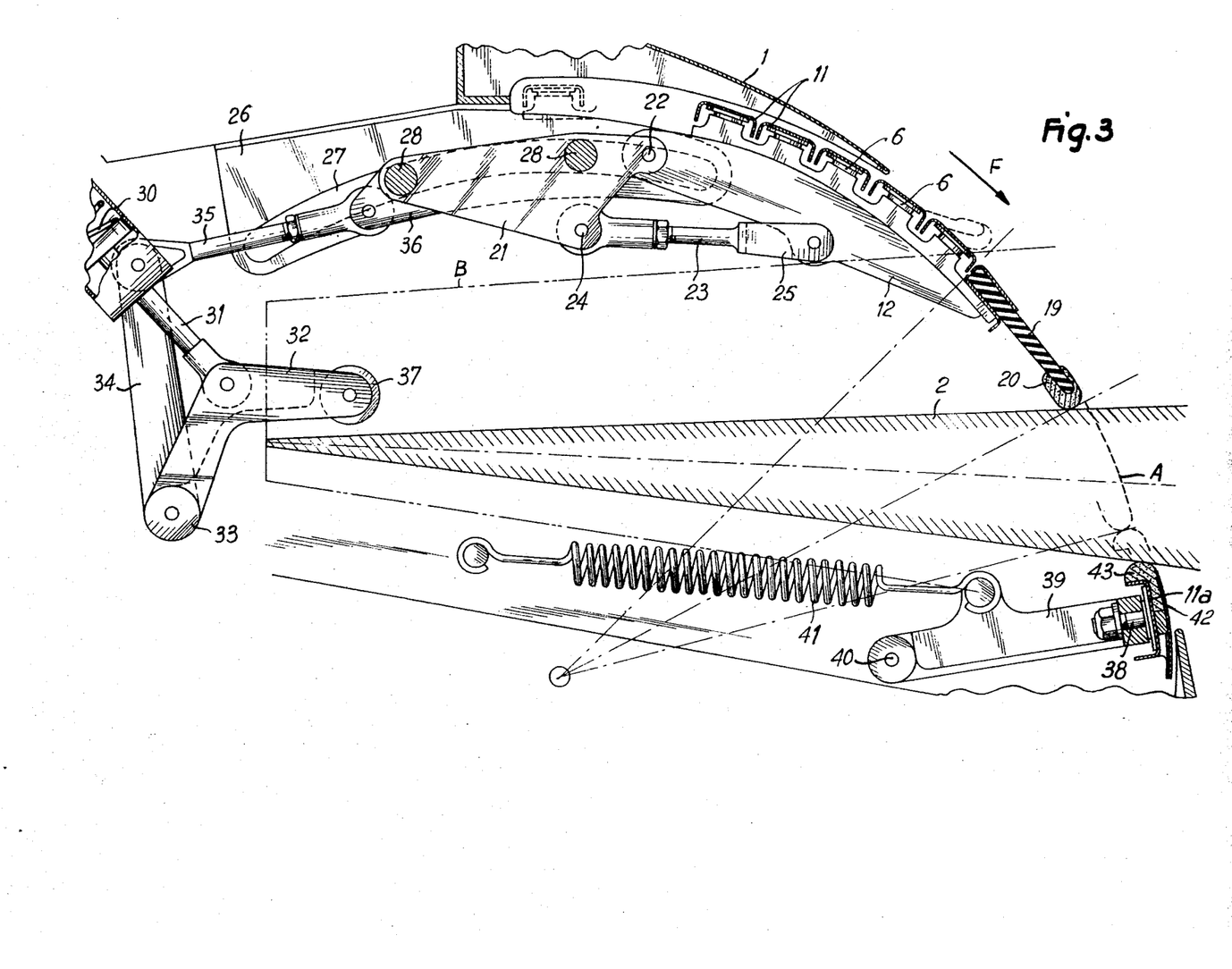
FIG. 3 shows in partial cross-section through the line III—III of FIG. 1, on a still more greatly enlarged scale, the two curtains associated to the same fuselage opening.
Figure 7:
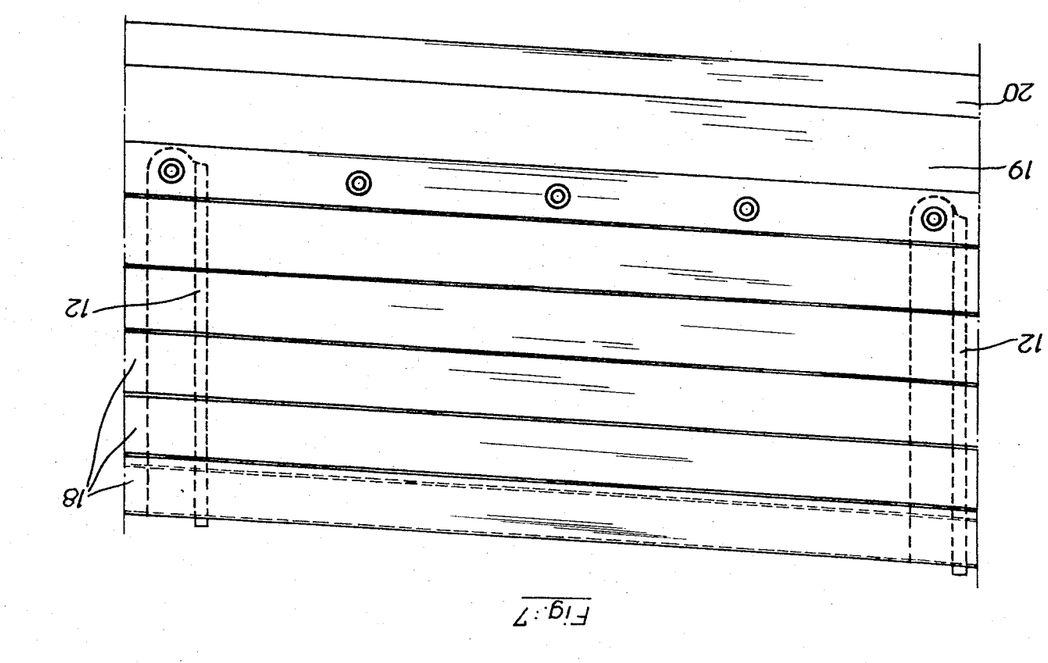
FIG. 7 is an external view of the curtain portion extending between two successive crosspieces.

The upper curtain consists of a plurality of metal channel-section blades 11 arranged in parallel spaced relationship and extending in a direction substantially parallel to the fore-aft axis of the fuselage. These blades are caused to form in a coherent entity by crosspieces 12, arranged across the length of the blades at suitable intervals and to which the blades are pivotally connected. As FIG. 4 clearly shows, each pivot comprises a flat head 13 which is riveted to the inside of the corresponding blade 11, and a cylindrical rod 14 journaled through a boss 15 of crosspiece 12 on a bronze bushing 16, the threaded end of rod 14 receiving a securing nut 17. The set of blades 11, and of crosspieces 12 (numbering four or five, say) to which the blades are pivotally secured as already indicated, forms a curtain framework which is deformable, that is to say which permits motion departing somewhat from the plane of the crosspieces, due to torsion of the blades 11 and pivoting thereof relatively to the crosspieces. The curtain is completed by a skin consisting for example of metal strips 18 which are welded or riveted to blades 11 and the closely spaced juxtaposed edges of which may be staggered with respect to the edges of blades 11 (see FIG. 4) in order to impart some measure of tightness to the curtain. Crosspieces 12 furthermore jointly form the transverse outline of the curtain, which outline is designed to match that of fuselage 1.

On its side proximate the wing, the curtain hereinbefore described terminates in a deformable rubber lip 19 which is likewise secured to crosspieces 12 and which is formed with a bead 20 made of a material having a low coefficient of friction, such as Teflon, in order to facilitate sliding of the upper wing surface along the edge of the curtain.

Having thus described the design principle of the upper curtain, an explanation will now be given of the way in which the same is kept movably in position.

Each crosspiece 12 is connected to a carriage 21, firstly by means of a direct articulation of the crosspiece on a clevis 22 formed on the carriage, and secondly via a link 23 pivotally connected at one end to a carriage clevis 24 and formed on its other end with a clevis 25 pivotally connected to the crosspiece. Links 23 are preferably adjustable in length so as to permit of exactly adjusting the mutual angular positions of the corresponding crosspiece 12 and the associated carriage 21. Each carriage is flanked and supported by two parallel supporting plates as at 26 (only one such plate being visible in FIG. 3, the other being located forward of the plane of FIG. 3). Plates 26 are formed with arcuate camming slots 27, each of which cooperates with a pair of followers provided on each side of the carriage. In FIG. 3, the follower axes are shown in section and designated by numerals 28. It will readily be understood that the system consisting of the plates 26 carried by the fuselage 1, the carriage 21 supported by these plates for motion along camming slots 27, the articulations 22 and the links 23, permits not only of supporting the curtain but also of moving it from its open position to its closed position, and vice versa, by shifting the carriages 21 along slots 27. A clearance is provided between each carriage and the supports 26 to permit slight movement of the carriage towards or away from one another during deformations of the curtain.

The curtain is continuously urged towards its closed position, i.e. in the direction of arrow F in FIG. 3, by a system which comprises, in respect of each carriage 21, a coil spring 30 which becomes operative when set under compression. This spring exerts thrust upon a rod 31 pivotally connected to a bell-crank 32 articulated about a fixed point 33. Bell-crank 32 is angularly rigid with an arm 34 which is connected via a link 35 to a clevis 36 of carriage 21. Through the medium of its bell-crank, each spring 30 consequently continuously pushes the carriage 21 and hence the crosspiece 12 and the curtain in the direction of arrow F. This tends to maintain the curtain either in the position in which it covers the opening (as shown in dash lines A in FIG. 3) by bearing against the lower curtain to be described hereinbelow, or in a position wherein it bears against the upper surface of wing 2 when the latter is retracted into the well B in the fuselage (as shown in solid lines in FIG. 3).

In the latter configuration the resilient mounting of the curtain enables it to follow wing deformations. In order to facilitate curtain movement when deformation occurs upwards, the bell-cranks 32 carry a wheel 37 with which the wing cooperates in its ascending motion, thereby initiating movement of the curtain in the opposite direction to arrow F.

In the form of embodiment described above, the lower curtain designed to cooperate with the lower wing surface has much less transverse spread than the upper curtain, though it could alternatively be designed to have an equal spread.

In the drawing it is shown as having a single blade 11a secured by pivots 38 to arms 39 which pivot about fixed points 40, and this blade 11a has a pull exerted on it by springs 41 which thus urge the lower curtain against the upper curtain so as to cover the fuselage opening when the wing is extended (as shown in dash lines at A in FIG. 3), or against the lower surface of wing 2 when the same is partly retracted into the fuselage. A metal skin strip 42 and a Teflon bead 43 are both provided. Preferably, blade 11a and metal covering strip 42 are both subdivided lengthwise so that upon making contact with the lower wing surface the lower curtain should have a broken-line lengthwise outline in order to more faithfully follow the curved lower wing surface. Obviously, a similar arrangement could be adopted for the blades 11 and the covering strips 18 of the upper curtain.

Figure 2:
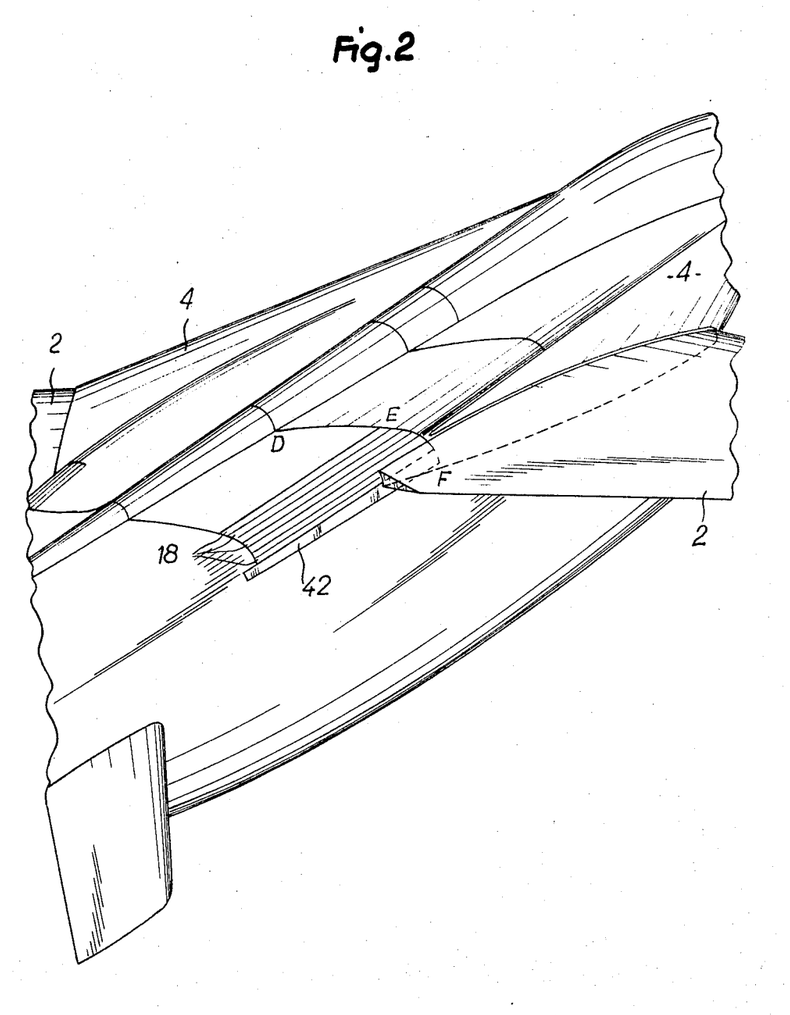
FIG. 2 shows in perspective, on an enlarged scale, the portion of the aircraft carrying the subject device of the invention, the wings being in their extended position and the obturating curtains being accordingly closed so as to fully cover the wing opening and restore the aerodynamic lines of the fuselage.

When both curtains are closed, as shown in dash lines A in FIG. 3, they form a continuous surface (see also FIG. 2).

In order to enable the wing edges a, b, c (FIG. 1) to be lodged in the fuselage opening when the wing is swept back, a spacing apart of the two curtains must be initiated.

Figure 8:
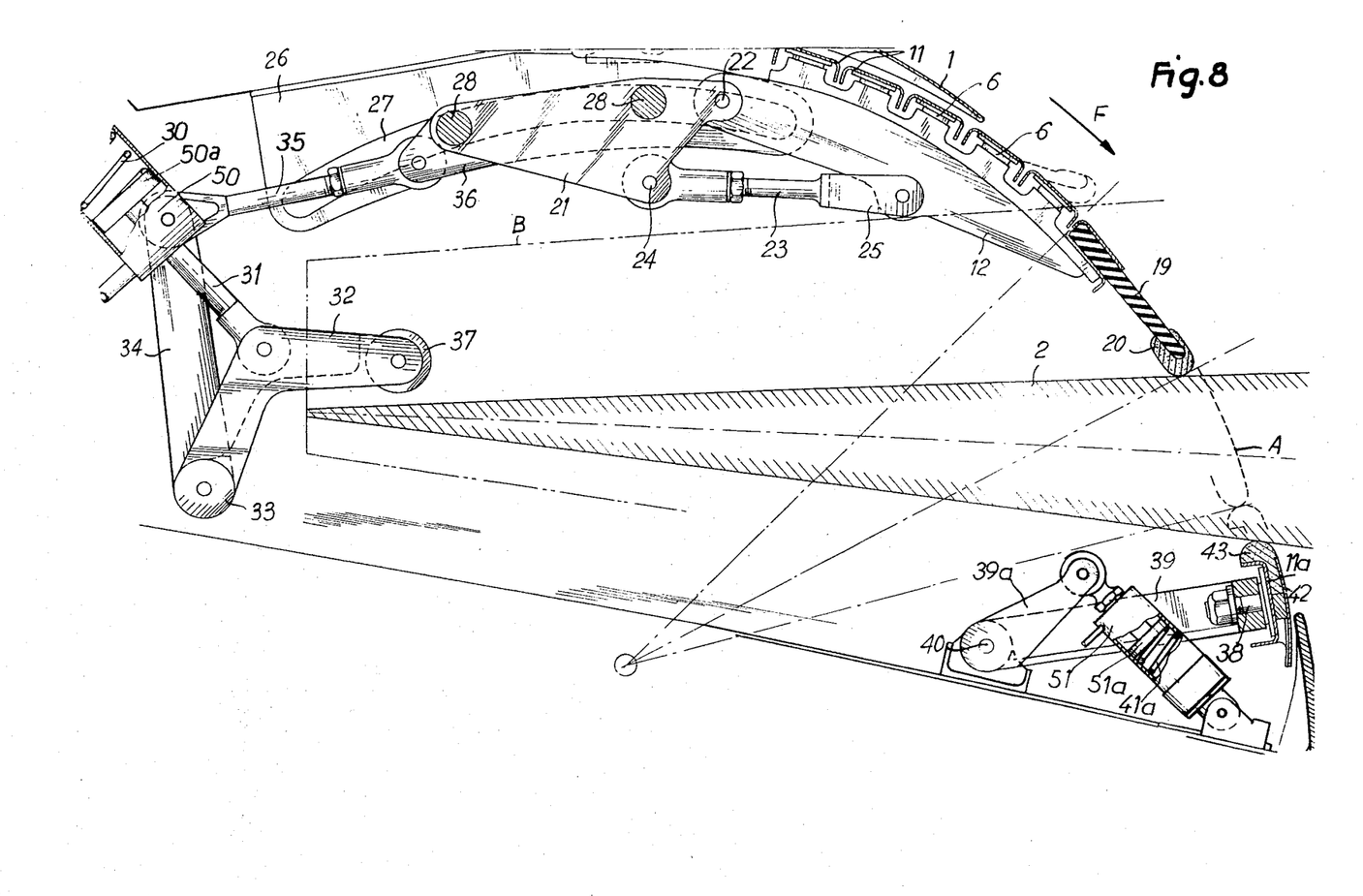
FIG. 8 is a sectional view corresponding to that of FIG. 3, but taken through the plane containing the actuators for controlling opening of the curtains.
Figure 9:
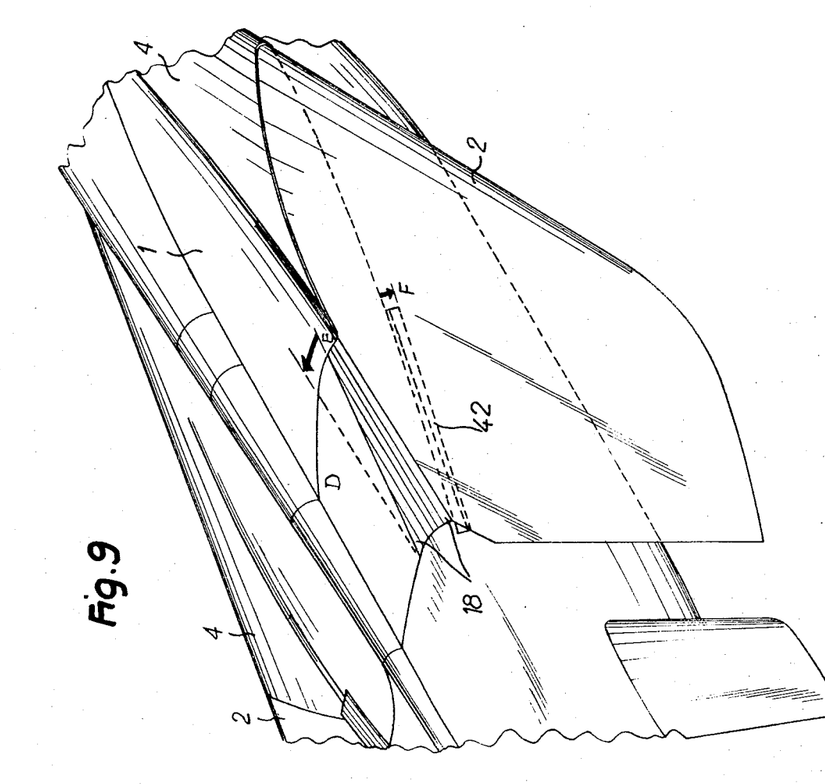
FIGS. 9 and 10 are views corresponding to that of FIG. 2 but showing respectively the positions of the curtains when one wing is retracted, the wing being assumed in FIG. 9 to be free from distortion and in FIG. 10 to exhibit distortion resulting from a positive loading thereon.
Figure 10:
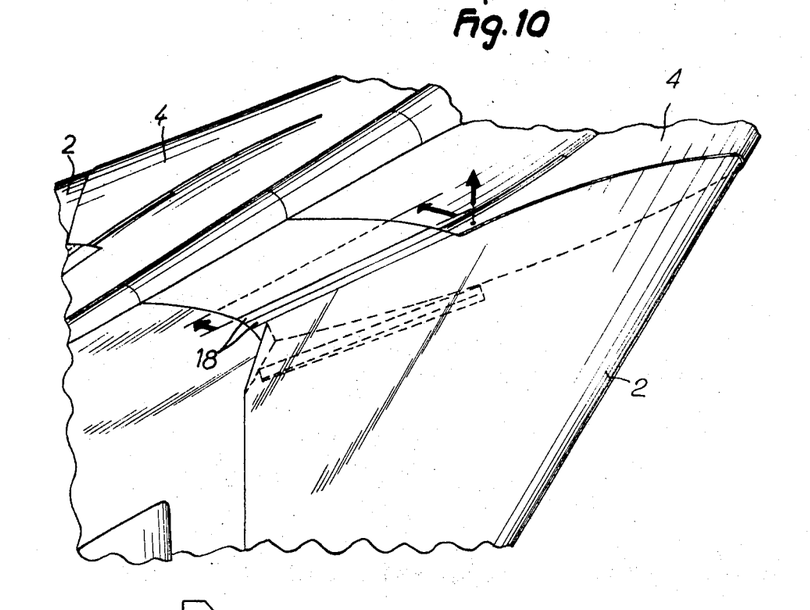

A curtain opening actuator is accordingly provided at the front end of each curtain, i.e. roughly in the plane containing the line D E F of FIG. 9. FIG. 8 shows this actuator arrangement: actuator 50 for the upper curtain and actuator 51 for the lower curtain. These two actuators are of the single-acting hydraulic type and their cylinders contain the springs 30 and 41a which bias the curtains into the closed position and act oppositely to the actuator pistons 50a and 51a (the lower curtain spring 41a being in this case a compression spring instead of the tension spring 41 of FIG. 3).

When these actuators are supplied with pressure fluid they neutralize the return springs 30 and 41a associated to the two curtains. Piston 50a of actuator 50 exerts pull on the carriage 21, which carriage is moved in opposition to spring 30, whereby the upper curtain is raised at its front portion. Piston 51a of actuator 51 exerts pull on crank 39a rigid with the arm 39 to which it is connected, whereby the lower curtain is lowered at its front portion. The two curtains thus clear a triangular-shaped opening permitting insertion of the wing 2 thereinto. As the insertion movement is pursued, the pressure may be released in both actuators, with the wing urging the two curtains apart against their associated opposing springs, by operating in the manner of a wedge.

I claim:

1. In a variable wing aircraft having a fuselage formed with an opening for the passage therethrough of an adjustable wing section, an obturator device for blinding portions of said opening not occupied by said wing section, comprising a movable curtain-like structure comprising a plurality of blades in substantially free relative juxtaposition, extending generally parallel to the longitudinal axis of the aircraft, support means pivotably carrying said blades about axes which are generally radial with respect to said fuselage and perpendicular to said longitudinal axis, and carrier members spaced longitudinally of said blades and extending in generally transverse planes with respect to said longitudinal axis, said members carrying said support means, said blades and carrier members forming a hinged network assembly capable of a substantial degree of deformation; means fast with said fuselage for guiding said carrier members for displacement in said transverse planes; and curtain extending means acting on said carrier members for urging said curtain-like structure to blinding position.

2. Obturator device as claimed in claim 1, wherein said movable curtain-like structure further comprises a flexible lip extending endwise the same and having a free edge adapted to engage said wing section.

3. Obturator device as claimed in claim 2, wherein said free lip edge comprises a bead of low friction material with respect to said wing section.

4. Obturator device as claimed in claim 3, wherein said material is Teflon.

5. Obturator device as claimed in claim 1, wherein said curtain extending means comprises resilient spring means.

6. Obturator device as claimed in claim 5, further comprising controllable actuator means acting in opposition to said spring means for initiating curtain opening.

7. Obturator device as claimed in claim 6, wherein said actuator means comprises a single-acting hydraulic jack.

8. Obturator device as claimed in claim 6, wherein said actuator means is associated with the foremost carrier member.

9. Obturator device as claimed in claim 5, further comprising wing section sensing means operatively linked to said curtain-like structure for urging the same against said resilient spring means.

10. Obturator device as claimed in claim 9, wherein said sensing means comprises a roller engaging said wing section.

* * * * *